United States Patent
Samuelson

[11] Patent Number: 5,634,272
[45] Date of Patent: Jun. 3, 1997

[54] DEVICE FOR A PIERCING A NUT

[76] Inventor: Shel L. Samuelson, 14 Lookout Dr., Ledgewood, N.J. 07852

[21] Appl. No.: 434,569
[22] Filed: May 4, 1995
[51] Int. Cl.⁶ .................................................. A47J 43/26
[52] U.S. Cl. ........................................ 30/120.3; 30/120.2
[58] Field of Search ............................ 30/120.1–120.5, 30/114, 115, 124, 134; 223/93; 137/680

[56] References Cited

U.S. PATENT DOCUMENTS

| | | | |
|---|---|---|---|
| 1,710,629 | 4/1929 | Lindsey. | |
| 2,426,120 | 8/1947 | Posey | 146/16 |
| 2,490,615 | 12/1949 | Bloomfield | 146/13 |
| 2,700,994 | 2/1955 | Welfel | 146/13 |
| 2,730,800 | 1/1956 | Bailey | 30/2 |
| 2,804,111 | 8/1957 | Burchett | 146/13 |
| 3,048,208 | 8/1962 | Umanoff | 146/13 |
| 3,924,326 | 12/1975 | Di Gaetano | 30/120.2 |
| 4,200,042 | 4/1980 | Scholz | 99/582 |
| 4,228,707 | 10/1980 | Arlett | 30/134 |
| 4,550,495 | 11/1985 | Fornes | 30/120.3 |
| 4,554,736 | 11/1985 | Rodriguez | 30/120.3 |
| 4,641,430 | 2/1987 | Hahn | 30/120.5 |
| 4,768,693 | 9/1988 | Tomaszewski | 225/94 |
| 5,052,107 | 10/1991 | Hirzel | 30/120.3 |
| 5,174,026 | 12/1992 | Writt | 30/120.2 |
| 5,361,688 | 11/1994 | Blankenship | 99/572 |

FOREIGN PATENT DOCUMENTS

| | | |
|---|---|---|
| 232827 | 2/1961 | Australia. |
| 975797 | 3/1951 | France. |
| 3139052 | 4/1983 | Germany. |
| 19608 | 7/1897 | United Kingdom. |

Primary Examiner—Douglas Watts
Attorney, Agent, or Firm—Thomas L. Adams, Esq.

[57] ABSTRACT

A nut can be pierced with a device employing an upper member having a manually engageable surface. The device also has a base with an underside adapted to stably rest atop a horizontal support surface. The upper member has a free end, a pivotal end, and a manually engageable surface. This member is mounted at the pivotal end to articulate atop the base. The cutter is mounted on the member proximate the free end and opposite the manually engageable surface. A retractable element is mounted adjacent to the cutter to reciprocate with respect thereto. This retractable element can retract relative to the member to expose and give the cutter clearance for piercing the nut.

30 Claims, 5 Drawing Sheets

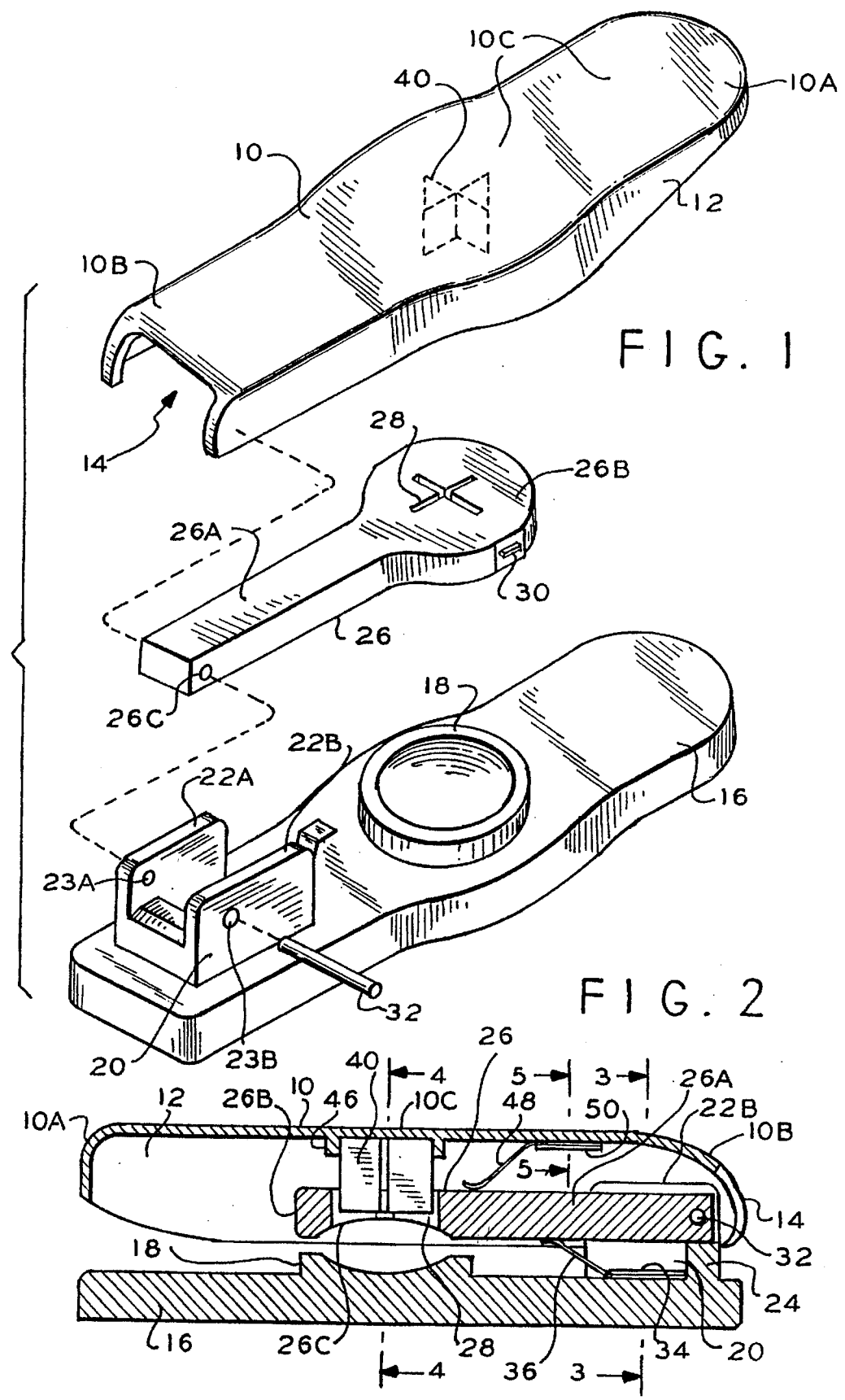

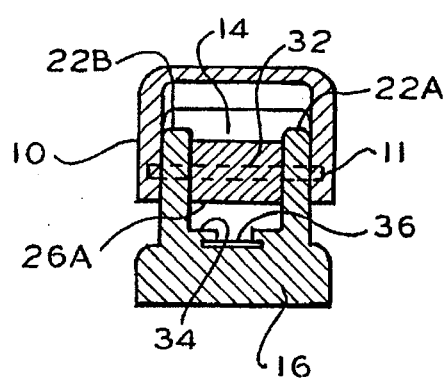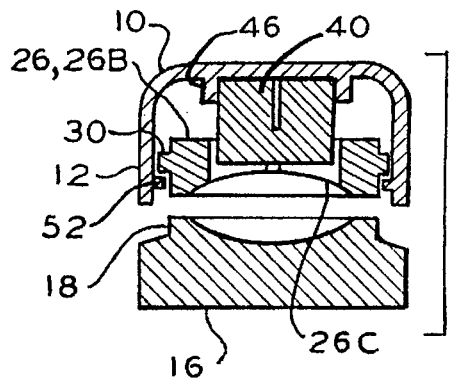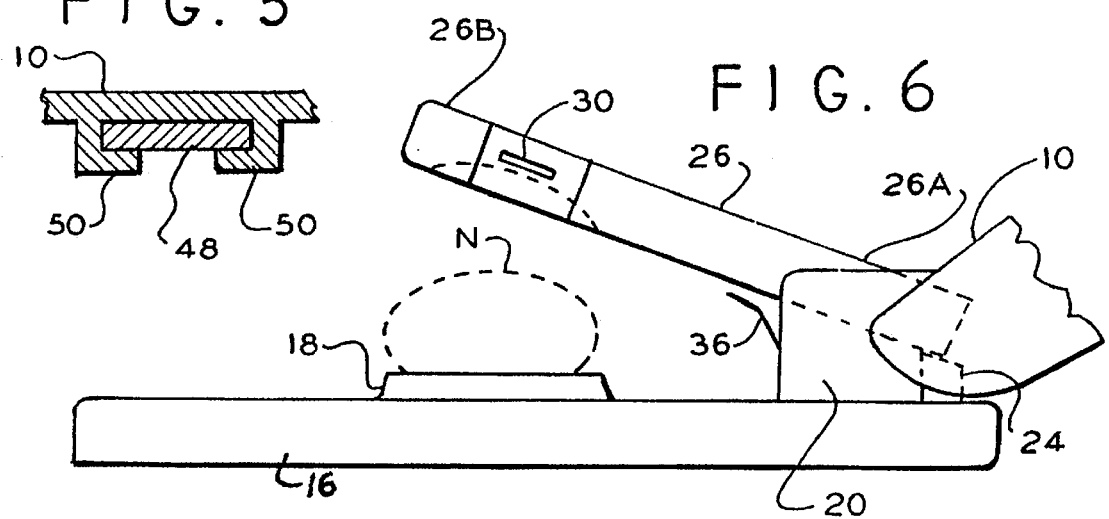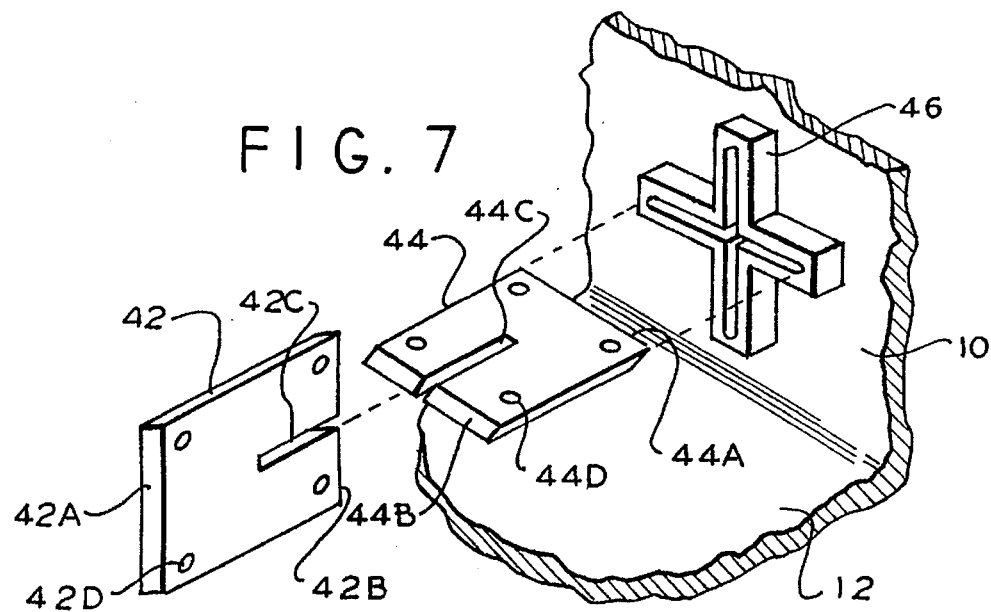

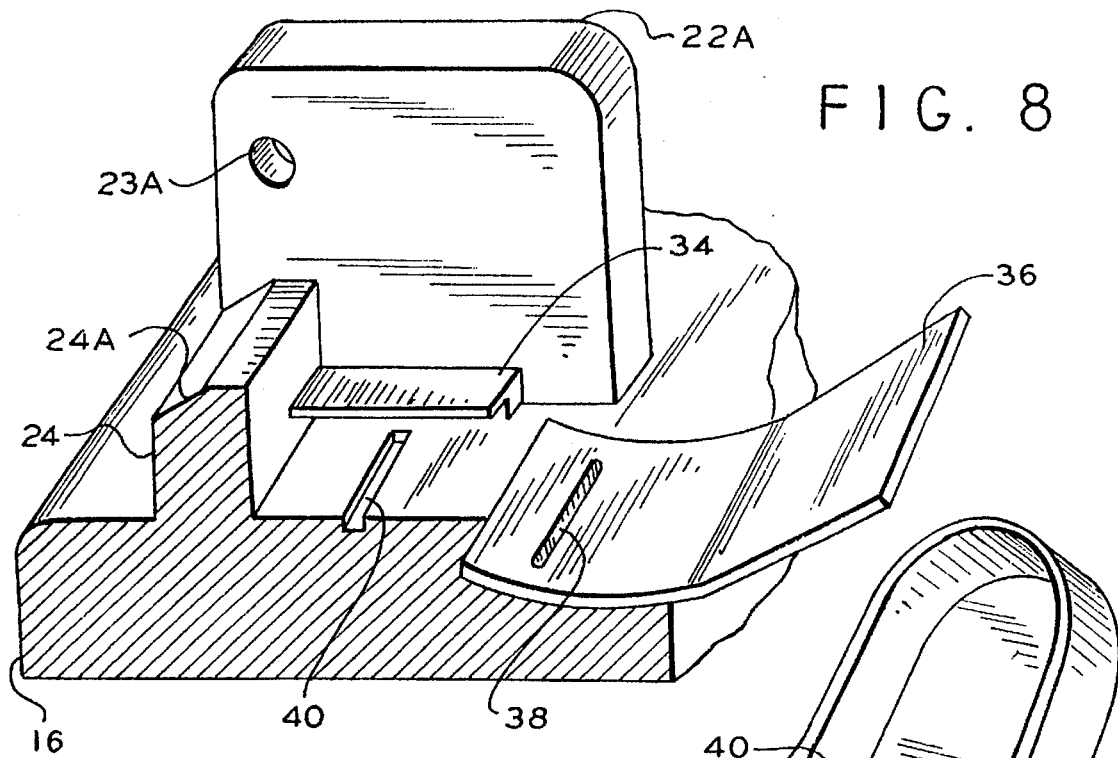
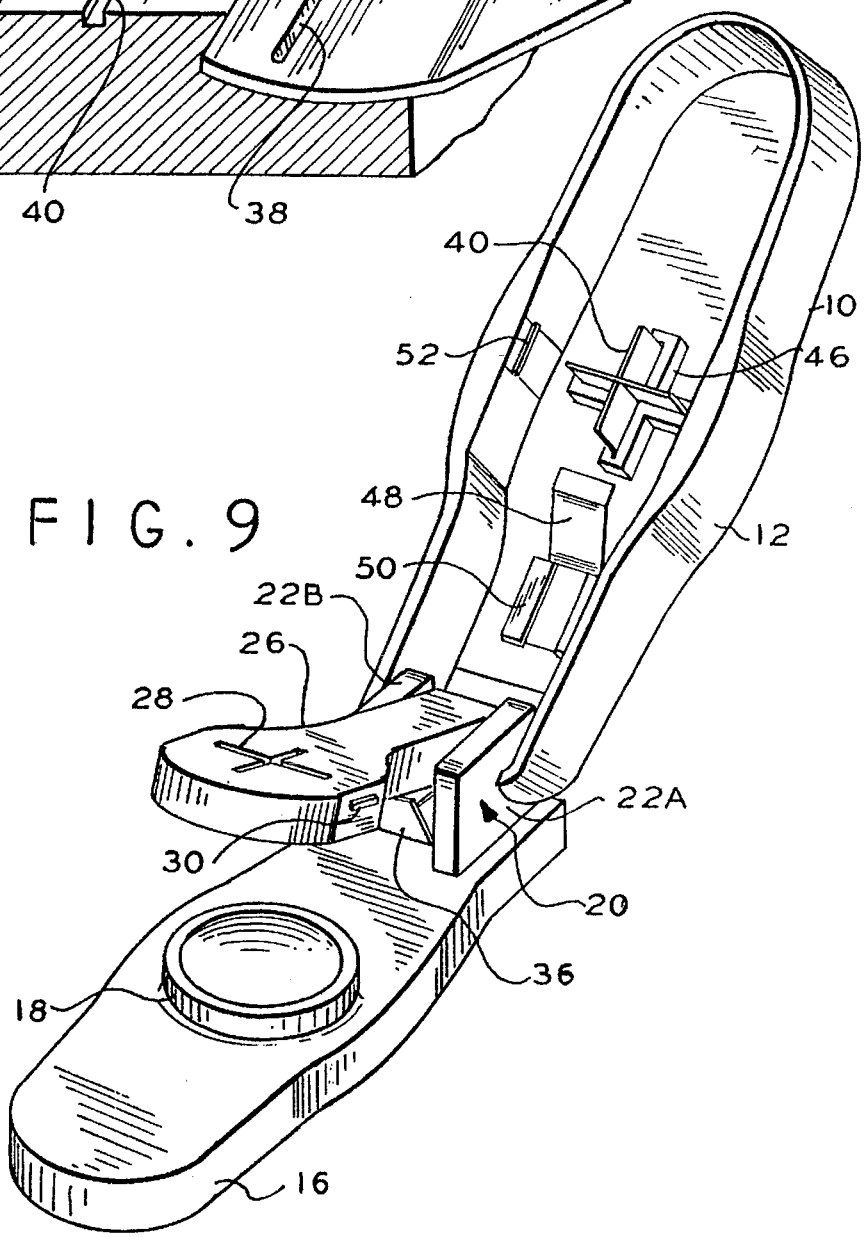

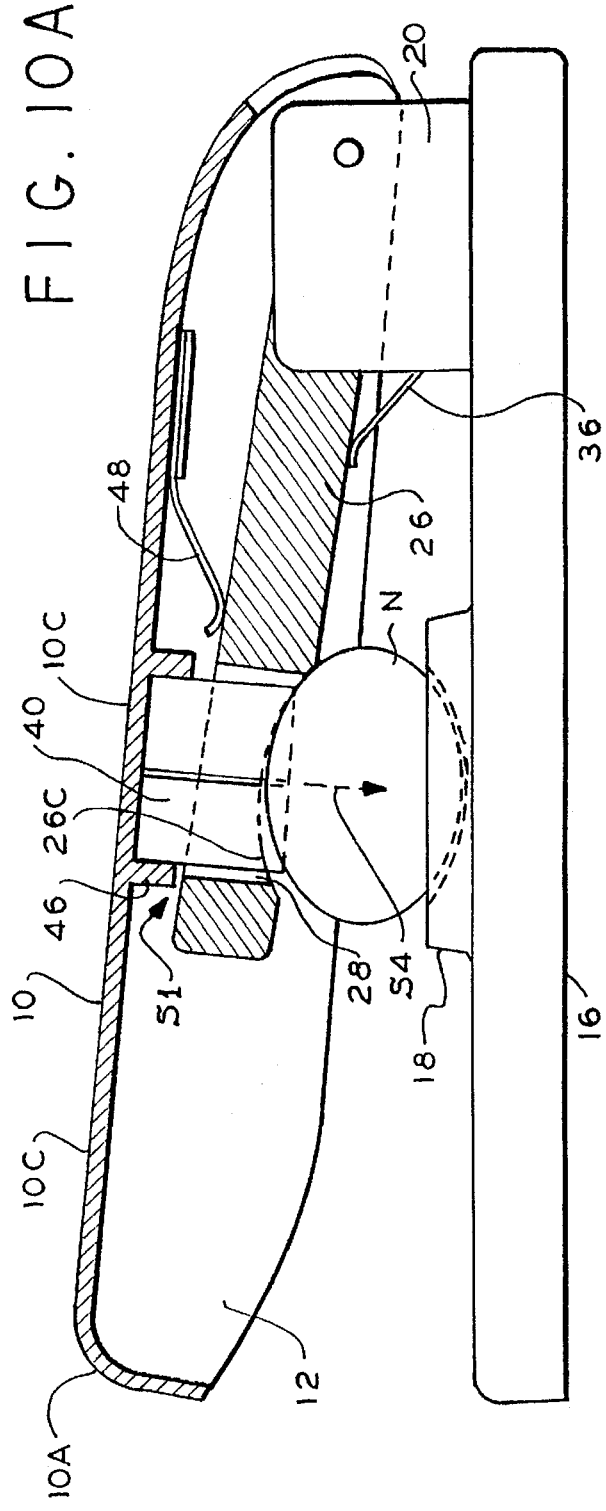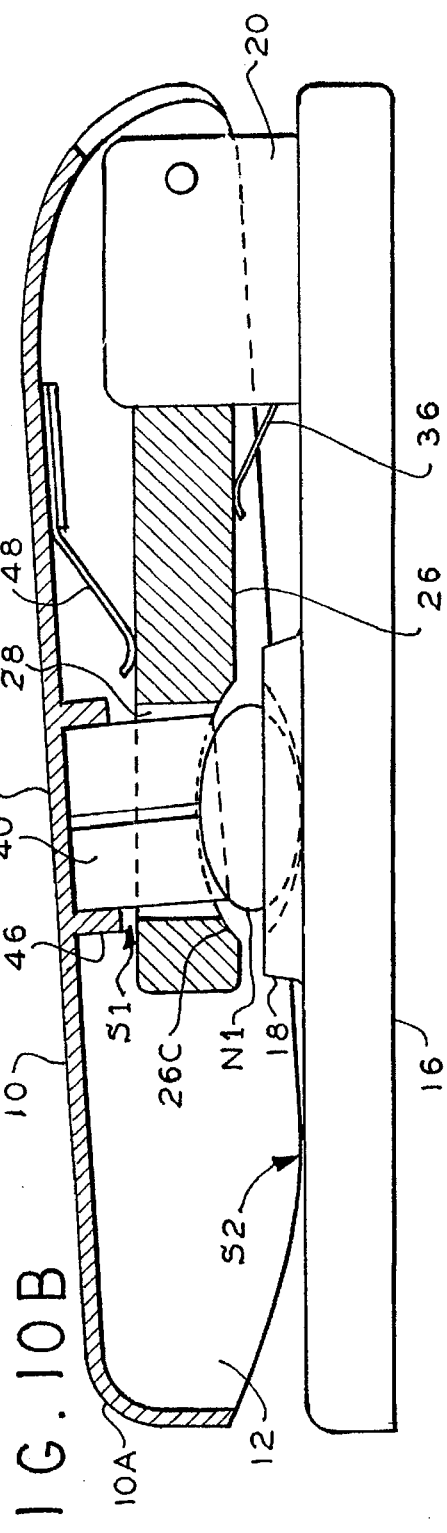

DEVICE FOR A PIERCING A NUT

BACKGROUND OF THE INVENTION

1. Field of the Invention

The present invention relates to devices for piercing a nut, and in particular, to devices having a manually operable cutter.

2. Description of Related Art

Before roasting certain nuts, such as chestnuts, the shell should be pierced to allow the escape of steam and to allow the meat of the nut to expand. Unless pierced, the nut has a tendency to explode, scattering and damaging the nut.

With this problem in mind, U.S. Pat. No. 2,700,994 proposed a plier-like device for piercing a chestnut. One Jaw of the device had crossed triangular blades arranged like a pyramid. A disadvantage with this device is that the chestnut tends to remain impaled on the blades, requiring manual removal. Also a plier-like device has the disadvantage that one hand must be dedicated to holding the pliers when repetitively piercing chestnuts. Thus, if two hands are needed during this procedure, the pliers must be laid aside and later fetched and reoriented before using. Furthermore, plier-like devices can be difficult to manipulate open and can demand much manual dexterity. In addition, such devices leave the piercing blades exposed, which presents a risk of personal injury.

Also, such devices lack a mechanism to hold the nut in place prior to the piercing operation. Also, such devices have no mechanism for limiting the depth of penetration of the blade, and can bore from one side of the nut to the other. To avoid excessive penetration the user must develop the judgement and feel for squeezing the plier-like device an appropriate amount for a particular size nut. Clearly, the difficulty in controlling such variability reduces the efficiency of these devices.

U.S. Pat. No. 5,052,107 shows a hinged device with two opposing Jaws. One jaw is annular for holding a chestnut, and the other jaw holds a blade to slit the chestnut. This device has similar disadvantages.

Other plier-like devices are known for opening a nut (as opposed to slitting). For example Australian Specification 232,827 shows a plier-like device having on one jaw a cup for holding a nut while the opposing jaw has a pointed and lobed device for cracking open the nut. Similarly, U.S. Pat. No. 3,048,208 shows another plier-like device in which one Jaw has a recess and the opposing Jaw a pair of crossed blades for cracking open a walnut. See also U.S. Pat. Nos. 1,710,629; 2,490,615; 2,804,111; 4,550,495; and 5,361,688, and DE-OS 3139052; FR 975,797; and UK 19,608.

Various tabletop devices are also known for cracking a nut. These have the advantage of being a unit that remains ready and lessens the need for the more complicated manipulations demanded by pliers. These known devices, however, are unconcerned with piercing a chestnut and do not suggest apparatus appropriate for such piercing. See U.S. Pat. Nos. 2,426,120; 4,200,042; 4,554,736; and 5,174,026.

In U.S. Pat. No. 3,924,326 a chestnut is prepared for roasting by slicing a segment from the nut as opposed to piercing the nut in the usual fashion.

U.S. Pat. No. 4,768,693 shows a table top, canister opener having four piercing blades and a shielding plate to prevent canister chards from flying about. This reference is unconcerned with piercing nuts.

Accordingly, there is a need for a convenient device for piercing a nut and that has one or more advantages, such as: automatically removal of the nut from the cutting blade, regulated penetration depth, protection from accidental cutting, or reduced manipulation during operation.

SUMMARY OF THE INVENTION

In accordance with the illustrative embodiments demonstrating features and advantages of the present invention, there is provided a device for piercing a nut. The device has a member with a manually engageable surface. A cutter is mounted on the member opposite the manually engageable surface. The device includes a retractable element mounted adjacent to the cutter to reciprocate with respect thereto. This retractable element is operable to retract relative to the member to expose and give the cutter clearance for piercing the nut.

According to another aspect of the present invention, a device for piercing a nut employs a base having an underside adapted to stably rest atop a horizontal support surface. This device has a member with a free end, a pivotal end, and a manually engageable surface. This member is mounted at the pivotal end to articulate atop the base. A cutter is mounted on the member proximate the free end and opposite the manually engageable surface.

By employing such apparatus a relatively simple, effective, and efficient device is achieved for piercing nuts, such as chestnuts. In a preferred embodiment, an upper member articulates from a boss molded to one end of a table-top base. The upper member can be a shell with skirts encompassing a slitting blade. The preferred slitting blade is a pair of interlocking, cruciform blades mounted in a socket on the underside of the upper member.

This preferred device has a retracting element pivotally mounted on the base to articulate on a common axis with the upper member. This retractable element preferably has a cruciform slot to allow passage of the cruciform cutting blade. Thus, the retractable element can cover the edges of cruciform blade to prevent accidental injury when the device is not in use. When used, the upper member can be manually depressed, causing the cruciform blades to protrude through the retractable element to pierce a chestnut lying on the base. When the upper member is released, spring biased forces can cause the retractable member to separate from the upper member carrying the cutting blade, thereby pushing the chestnut off the cruciform blade, leaving the chestnut lying free on the base for easy retrieval.

The preferred device has a bowl shaped basin on the base for cradling the nut. The underside of the preferred retractable element is also bowl shaped so that the chestnut can be positively held and located between the base and the retractable element.

In this preferred embodiment, the depth of penetration of the cruciform blade can be limited by limiting the extension of the blade through the retractable arm. Furthermore, the blade will preferably descend only a limited amount before its supporting member contacts the base and stops.

BRIEF DESCRIPTION OF THE DRAWINGS

The above brief description as well as other objects, features and advantages of the present invention will be more fully appreciated by reference to the following detailed description of presently preferred, but nonetheless illustrative embodiments in accordance with the present invention, when taken in conjunction with the accompanying drawings, wherein:

FIG. 1 is an exploded, axonometric view of a device in accordance with the principles of the present invention;

FIG. 2 is a cross-sectional, elevational view of the device of FIG. 1 assembled, taken along a longitudinal axis;

FIG. 3 is a transverse, cross-sectional, elevational view of the device, taken along line 3—3 of FIG. 2;

FIG. 4 is a transverse, cross-sectional, elevational view of the device, taken along line 4—4 of FIG. 2;

FIG. 5 is a transverse, cross-sectional view of a fragment of the device, taken along line 5—5 of FIG. 2;

FIG. 6 is a side, elevational view of the device of FIG. 2 with the upper member rotated up the maximum amount and with the retractable element lifted moderately;

FIG. 7 is a detailed, exploded, axonometric view of a fragment of the underside of the upper member of FIG. 1, showing the attachment of the cutter;

FIG. 8 is an axonometric view of a fragment of the base of FIG. 1, showing a detail of the boss and the attachment of the leaf spring;

FIG. 9 is an axonometric view of the device, opened as shown in FIG. 6;

FIG. 10A is a side elevational view of the device of FIG. 2, partly in section, showing the device piercing a relatively large chestnut; and FIG. 10B is a side elevational view of the device of FIG. 2, partly in section, showing the device piercing a relatively small chestnut.

DETAILED DESCRIPTION OF THE PREFERRED EMBODIMENTS

Figure 4A:
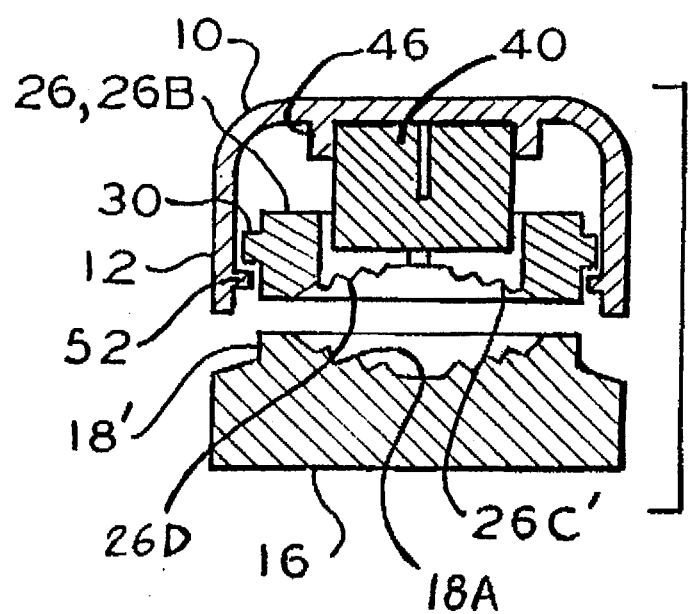
FIG. 4A is a transverse, cross-sectional, elevational view of a device that is an alternate to that shown in FIG. 4.

Referring to FIGS. 1, 2, 3 and 9, a device is shown employing an upper member 10 in the form of a shell with a skirt 12 parted at rear opening 14. Skirt 12 is relieved at the free end 10A to provide a tapered nose. The overall shape is like an inverted trough. Upper member 10 has a free end 10A and a pivotal end 10B. A base 16 is shown as a solid molded slab 16, although in some embodiments the underside of base 16 can be hollowed to save material. The base 16 has rounded edges and a central width expanded in the vicinity of basin 18. Upper member 10 has a width that varies in the same manner as the width of base 16.

Basin 18 is a bowl-like cradle molded atop base 16 and sized to receive nuts of various sizes such as chestnuts. The interior of basin 18 may be formed with a number of optional, concentric, annular ridges designed to grip the surface of a chestnut; although in some embodiments other gripping protrusions are contemplated. FIG. 4A shows annular ridges 18A in basin 18' (components in FIG. 4A corresponding to components in FIG. 4 bear the same reference numbers). Molded on top at one end of base 16 is a boss 20 in the form of a pair of parallel side walls 22A and 22B. An abutment 24 extends between the walls 22A and 22B.

A retractable element 26 is shown with an arm 26A meeting a paddle-like end 26B. End 26B has molded through it a channel in the form of cruciform slot 28. The topside of paddle end 26B is flat while the under-side 26C is concave or bowled. Bowled surface 26C can have annular ridges similar to basin 18.

FIG. 4A shows annular ridges 26D in surface 26C' (components in FIG. 4A corresponding to components in FIG. 4 bear the same reference numbers). A pair of embossments 30 are shown projecting from the flattened side edges of paddle end 26B, for purposes to be described presently.

The inside faces of skirt 12 near the pivotal end 10B have a pair of blind holes 11 sized and positioned to receive pin 32. Pin 32 is designed to extend through hole 23B in wall 22A, hole 26C in element 26, and hole 23A in wall 22A. Pin 32 is long enough that its opposite ends extend outwardly to snap into the blind holes 11 on the inside of skirt 12 near the pivotal end 10B of upper member 10.

Referring to FIGS. 2, 3 and 8, a grooved section 34 is shown as a shelf protruding inwardly from the inside face of wall 22A (FIG. 8). It will be appreciated that a similar shelf projects inwardly from wall 22B. A separation means is shown herein as a leaf spring 36 in the form of a metal strip having upper and lower tabs connected by an oblique, intermediate section. In FIG. 8 the lower end of leaf spring 36 is shown slightly bowed or curled and also having a dimple 38 sized to snap into groove 40 molded atop base 16. Since the lower end of leaf spring 36 is deflected from a planar condition (by being curled and having a dimple 38) the leaf spring 36 can be snapped into place.

Referring to FIGS. 2, 4, 7 and 9, a cutter 40 is shown as a pair of crossed blades 42 and 44. Blades 42 and 44 are shown as rectangular plates having beveled cutting edges 42A, 42B, 44A and 44B. Blades 42 and 44 are cleft by slots 42C and 44C, respectively, so that the blades can interlock perpendicularly to form a cruciform cutting edge with edges 42A and 44B. Edges 42B and 44A are held in reserve and are shown fixed into a cruciform socket 46 molded into the underside of upper member 10.

Preferably, blades 42 and 44 are permanently secured in socket 46. Nevertheless, blades 42 and 44 are illustrated in a removable form to facilitate cleaning, replacement and sharpening. Accordingly, edges 44A and 42B snap into the recesses in socket 46, since each of the blades 42 and 44 have in their four corners four protrusions 42D and 44D, respectively. It will be appreciated that similar protrusions can be made on the reverse sides of the blades that are not visible in FIG. 7. Alternatively, the protrusions 42D and 44D can be formed as dents, that is, concave on one side and convex on the opposite side. In some embodiments blades 42 and 44 can be secured to the upper member 10 instead by pins, screws, and clamps of various types.

While a pair of cutting edges are shown perpendicular to the thrust direction, in other embodiments the cutting edges can be pointed or angled to cause progressive piercing, more in the nature of a slicing action. Also the crossed blades can be in some embodiments replaced with a single blade so that a single slit is obtained.

As described further hereinafter, downward pressure can be applied onto the blades 42 and 44 by applying manual pressure on the manually engageable surface 10C that is on the outside of member 10 opposite cutter 40. This allows cutter 40 to move within slot 28 of retractable element 26.

The retractable element 26 can have a shape different than a paddle shape. For example, in some embodiments, the element may be fork-like and straddle the cutter without completely encircling it. Also, in some embodiments the retractable element may be pivoted at a point different than upper member 10.

Referring to FIGS. 2, 5 and 9, a resilient means is shown as leaf spring 48 having a shape very similar to leaf spring 36. The upper end of leaf spring 48 may also be curled and dimpled to give it a surface that is deflected from planar. This will enable spring 48 to bind into the grooved section 50 molded on the underside of upper member 10.

Referring to FIG. 4, a restraint means is shown as an embossed shelf 52 molded on the inside face of the skirt 12 of upper member 10. Shelf 52 is sized to abut the embossment 30 on the side of paddle end 26B of the retractable element 26. This abutting, however, is not so extensive that the retractable element 26B cannot be pulled past shelf 52 as skirt 12 slightly deflects.

To facilitate an understanding of the principles associated with the foregoing apparatus its operation will be briefly described. As shown in FIG. 4, the paddle end 26B of the retractable element has an underside that is at about the same elevation as the lower edge of the skirt 12 of upper member 10, in the absence of working forces that would tend to drive retractable element 26 upwardly. Under these neutral circumstances, embossment 30 rests on shelf 52 and is driven there by spring 48 (FIG. 2).

Retractable element 26 can be elevated as shown in FIG. 6 until arm 26A contacts the abutment surface 24A on abutment boss 24 (FIGS. 6 and 8). In this situation the underside of arm 26A is stopped by contacting abutment surface 24A. (In a working configuration, upper member 10 is not pulled back to the extreme position illustrated in FIG. 6, but remains interlocked and approximately parallel to retractable element (26).

In any event, retractable element 26 is held up (with member 10) to give the clearance illustrated in FIG. 6, allowing nut N to be placed in basin 18. Under these circumstances, the user is able to easily center the nut N in the bottom of basin 18. Without downward manual pressure being applied to member 10, element 26 and upper member 10 will be parallel and blade 40 will not extend beyond member 26. Cutter 40 will remain sheathed due to the retracting force applied by leaf spring 48 to element 26, so that the operator is not exposed to cuts when manually inserting the nut N in basin 18. Thereafter, upper member 10 can be lowered so retractable element 26 will rest atop nut N as shown in FIG. 10A. The bowled surface 26C of arm 26 will hold nut N in place and keep it centered with respect to blade 40.

Next, the operator will manually apply downward force to the manually engageable surface 10C. This manually engageable surface is deemed to extend from a region directly over blade 40 to areas along essentially the entire length of upper member 10. In fact, while force can be applied directly over blade 40, additional leverage can be achieved by applying force closer to the nose 10A of upper member 10.

Depending upon the style of the operator, the piercing can be achieved by a slow and steady pressure or by a downward thrust in the nature of a blow. In any event, cutter 40 pierces nut N by penetrating in the thrust direction illustrated in phantom by arrow 54 in FIG. 10A. The descent of retractable element 26 is at this time limited by bowled surface 26C contacting the top of nut N. As the piercing proceeds, however, the cutter 40 and member 10 move down relative to retractable member 26. Effectively, the cutter 26 is unsheathed and extends beyond bowled surface 26C. In relative terms, retractable element 26 retreats or retracts with respect to cutter 40.

With a relatively large nut N, upper member 10 never descends low enough to be stopped by contact with base 16. Instead, member 10 descends relative to the now spatially fixed retractable element 26, until the distal end of cruciform socket 46 engages the topside of arm 26 at location S1. This engagement prevents the cutter 40 from extending any beyond the bowled surface 26C of retractable element 26 any more than a predetermined maximum amount. This feature thus limits the depth of penetration of cutter 40 into the nut N as illustrated in FIG. 10A.

As the operator releases the downward pressure applied to surface 10C leaf springs 36 and 48 tend to lift retractable element 26 and upper member 10. Leaf spring 48 is designed with sufficient spring force to cause member 10 to rise more than retractable element 26. Effectively, nut N is held back by retractable element 26 as cutter 40 withdraws through cruciform slot 28. The retractable element 26 remains essentially in the position illustrated in FIG. 10A, while member 10 rotates up to a position essentially parallel with retractable element 26. At that time cutter 40 is no longer penetrating nut N.

The upper member 10 can then be released and the nut N will remain resting in the basin 18, unimpaled. The nut will be retrieved manually in a simple manner. After the pierced nut is removed, the operator can simply remove both hands from the device of FIG. 10A which will remain in an appropriate ready position awaiting insertion of the next nut.

Referring to FIG. 10B, the device of FIG. 10A is shown operating with a smaller nut N1. With a smaller nut, retractable element 26 descends lower, here to an approximately horizontal position. The descent of arm 26 is again limited by the bowled surface 26C contacting the top of nut N1.

As before, blade 40 is unsheathed and extends through retractable element 26 to pierced nut N1 as shown. In this case, however, the downward descent of upper member 10 is not limited by the cruciform socket 46 contacting the arm 26 at location S1. Instead, skirt 12 contacts the top of base 16 at position S2 to stop member 10. This alternate stopping feature limits the absolute descent of cutter 40 and therefore limits the depth of penetration of cutter 40 into nut N1.

When the stopping location S2 is influential, the depth of penetration of cutter 40 is determined by the size of nut N1. Effectively, cutter 40 stops at its minimum elevation, so that the smaller the nut, the less cutter penetration. In contrast, the depth of penetration shown in FIG. 10A, when influenced by stopping location S1, is determined by the fixed amount of extension of cutter 40 past arm 26. Thus for larger nuts, the depth of penetration is relatively constant.

After operator is finished piercing a number of chestnuts, the device can be readily cleaned by being opened as shown in FIGS. 6 and 9. This leaves the slot in retractable element 26 accessible for cleaning with implements such as a brush or pick. Also with upper member 10 swung free of the retractable element 26, cutter 40 is accessible for cleaning. Furthermore, as shown in FIG. 7, blades 42 and 44 can be removed for thorough cleaning. Also, the blades can be inverted so that cutting edges 42B and 44A can be substituted for cutting edges 42A and 44B, respectively. This reversal provides a fresh, sharp edge and extended usage between sharpening or replacement.

In embodiments employing a single blade (non-cruciform), multiple penetrations can be made by repeatedly piercing and rotating the nut. Also while the piercing of chestnuts are described, various other nuts or other edible items may be pierced as needed.

It is to be appreciated that various modifications may be implemented with respect to the above described preferred embodiments. While the illustrated device is approximately the size of a conventional desktop stapler, in other embodiments, a larger or smaller device can be used depending upon the desired leverage, capacity, stroke, depth of penetration, nut size, etc. In addition, the permissible angular relations between the top member and retractable element can be altered for similar reasons. Furthermore, in some embodiments the device may be hand held (one or two hands) rather than a desktop model. Also, the illustrated leaf springs can be replaced with springs of various types located in other positions to bias the illustrated components as needed. Moreover, instead of a boss projecting upwardly from a base for journaling the pivotal elements, the pivotal elements themselves may have projections extending down to an axle mounted in the base itself. In addition, while the upper member and base are shown with a non-uniform width, in some embodiments the width may be constant. Furthermore, while the various components are preferably made of molded plastic, other embodiments may employ cast metals, ceramics, or other materials fabricated in various ways.

Obviously, many modifications and variations of the present invention are possible in light of the above teachings. It is therefore to be understood that within the scope of the appended claims, the invention may be practiced otherwise than as specifically described.

I claim:

1. A device for piercing a nut, comprising:

a member having a manually engageable surface;

a cutter mounted on said member opposite said manually engageable surface;

a retractable element mounted adjacent to said cutter to reciprocate with respect thereto, said retractable element being operable to move relative to said member and having means for progressively exposing and giving said cutter clearance for piercing said nut, said retractable element having an indented underside facing in said thrust direction for engaging and holding in place said nut.

2. A device according to claim 1 wherein said cutter is positioned to engage said nut along a thrust direction, said retractable element being positioned to engage said nut along said thrust direction, said retractable element having means for limiting depth of penetration for said cutter.

3. A device according to claim 2 wherein said retractable element is operable to retract and progressively expose said cutter until said retractable element contacts said member.

4. A device according to claim 2 wherein said bowled surface of said retractable element has annular ridges.

5. A device according to claim 1 wherein said retractable element has a channel through which said cutter is mounted to reciprocate.

6. A device according to claim 2 wherein said cutter has a cutting edge, and wherein said retractable element is operable to shield said cutting edge.

7. A device according to claim 2 wherein said cutter has a cruciform cutting edge, said channel in said retractable element being a cruciform slot.

8. A device according to claim 1 wherein said cutter is positioned to engage said nut along a thrust direction, said retractable element having a surface facing in said thrust direction for engaging said nut, said device including:

resilient means for urging said retractable element in said thrust direction to dislodge said nut from said cutter, absent a countervailing force.

9. A device according to claim 8 wherein said resilient means is mounted between said member and said retractable element for urging said retractable element to pivot away from said member in said thrust direction.

10. A device according to claim 9 wherein said resilient means comprises a leaf spring.

11. A device according to claim 10 wherein said member has a grooved section for holding said leaf spring, said leaf spring having a surface deflected from planar for binding said leaf spring into said groove.

12. A device according to claim 1 wherein said cutter comprises a pair of crossed blades.

13. A device according to claim 1 wherein said cutter comprises a pair of crossed blades each cleft to straddle the other.

14. A device according to claim 13 wherein said member has a cruciform socket sized to hold said crossed blades, said crossed blades being identical and each having a surface deflected from planar for binding each in said cruciform socket.

15. A device according to claim 1 comprising:

a base supporting said member.

16. A device according to claim 15 wherein said base includes a basin for cradling said nut below said cutter.

17. A device according to claim 16 wherein said member is mounted on said base to allow said cutter to move toward said base until said member contacts said base, said cutter having means for limiting depth of penetration of said cutter.

18. A device according to claim 17 comprising:

a separation means for urging said retractable element away from said base to allow clearance for placement of said nut between said base and said retractable element.

19. A device according to claim 18 wherein said base has a grooved section, said separation means comprising:

a leaf spring mounted in said grooved section in said base, said leaf spring having a surface deflected from planar for binding said leaf spring into said grooved section.

20. A device according to claim 19 wherein said basin has annular ridges.

21. A device according to claim 15 wherein said base comprises:

a boss mounted at an end of said base for pivotally supporting said member, said boss having an abutment surface for engaging said retractable element and limiting its angle of elevation relative to said base.

22. A device according to claim 1 wherein said member comprises:

restraint means for releasably holding said retractable element proximate to said member.

23. A device for piercing a nut, comprising:

a base having an underside adapted to stably rest atop a horizontal support surface, said base having a basin for cradling said nut below said cutter;

a retractable element mounted adjacent to said cutter to reciprocate with respect thereto, said retractable element being operable to move relative to said member and having means for progressively exposing and giving said cutter clearance for piercing said nut, said retractable element having an indented underside facing in said thrust direction for engaging and holding in place said nut; and a member having a free end, a pivotal end, and a manually engageable surface, said member being mounted at said pivotal end to articulate atop said base; and a cutter mounted on said member proximate said free end and opposite said manually engageable surface and having means for piercing said nut in said basin without transpiercing.

24. A device according to claim 23 wherein said cutter comprises a pair of crossed blades.

25. A device according to claim 23 wherein said cutter comprises a pair of crossed blades each cleft to straddle the other.

26. A device according to claim 23 wherein said member has a cruciform socket sized to hold said crossed blades, said crossed blades being identical and each having a surface deflected from planar for binding each in said cruciform socket.

27. A device according to claim 26 wherein said member is mounted on said base to allow said cutter to move toward said base until said member contacts said base, so that said cutter has a limited depth of penetration.

28. A device according to claim 23 wherein said basin has annular ridges.

29. A device according to claim 23 wherein said base comprises:

a boss mounted at an end of said base for pivotally supporting said member, said boss having an abutment surface for engaging said member and limiting its angle of elevation relative to said base.

30. A device for piercing a nut, comprising:

a base having an underside adapted to stably rest atop a horizontal support surface, said base having a basin for cradling said nut below said cutter;

a member having a free end, a pivotal end, and a manually engageable surface, said member being mounted at said pivotal end to articulate atop said base, said base having a boss mounted at an end of said base for pivotally supporting said member, said boss having an abutment surface for engaging said member and limiting its angle of elevation relative to said base, said member including a shell sized and shaped to abut said boss and to allow rotation to a limited angle of elevation; and a cutter mounted on said member proximate said free end and opposite said manually engageable surface and having means for piercing said nut in said basin without transpiercing.

* * * * *